United States Patent
Nikkanen et al.

(10) Patent No.: US 7,548,262 B2
(45) Date of Patent: Jun. 16, 2009

(54) METHOD, APPARATUS, IMAGING MODULE AND PROGRAM FOR IMPROVING IMAGE QUALITY IN A DIGITAL IMAGING DEVICE

(75) Inventors: Jarno Nikkanen, Tampere (FI); Ossi Kalevo, Toijala (FI)

(73) Assignee: Nokia Corporation, Espoo (FI)

( * ) Notice: Subject to any disclaimer, the term of this patent is extended or adjusted under 35 U.S.C. 154(b) by 697 days.

(21) Appl. No.: 11/147,477

(22) Filed: Jun. 7, 2005

(65) Prior Publication Data
US 2005/0270402 A1   Dec. 8, 2005

(30) Foreign Application Priority Data
Jun. 7, 2004   (WO) ............... PCT/FI2004/050082

(51) Int. Cl.
*H04N 5/217* (2006.01)
(52) U.S. Cl. .................. 348/241; 348/251; 382/274
(58) Field of Classification Search .............. None
See application file for complete search history.

(56) References Cited

U.S. PATENT DOCUMENTS

| | | | |
|---|---|---|---|
| 7,426,316 B2 * | 9/2008 | Vehvilainen | 382/275 |
| 2003/0025837 A1 | 2/2003 | Krogstad et al. | 348/674 |
| 2003/0234864 A1 | 12/2003 | Matherson et al. | 348/175 |
| 2003/0234872 A1 | 12/2003 | Matherson et al. | 348/222.1 |
| 2004/0041919 A1 * | 3/2004 | Yamanaka | 348/222.1 |
| 2004/0257454 A1 * | 12/2004 | Pinto et al. | 348/222.1 |
| 2005/0179793 A1 * | 8/2005 | Schweng | 348/251 |

* cited by examiner

*Primary Examiner*—Sinh N Tran
*Assistant Examiner*—Paul Berardesca (57) ABSTRACT

The invention relates to a method, apparatus, imaging module and program for improving image quality in a digital image. The digital image according to the invention is captured with an imaging module including an imaging optics (101) and an image sensor (102), where the image is formed through the imaging optics (101) onto the light sensitive image sensor (102). According to embodiments of the present invention vignetting effect of the digital image captured with the imaging module (101, 102) is determined and compensated separately for at least two of the primary color components of the imaging module (101, 102).

28 Claims, 2 Drawing Sheets

METHOD, APPARATUS, IMAGING MODULE AND PROGRAM FOR IMPROVING IMAGE QUALITY IN A DIGITAL IMAGING DEVICE

BACKGROUND AND FIELD OF THE INVENTION

The invention concerns correcting vignetting in an imaging chain for processing image data obtained from sensors of a digital imaging device into a processed image.

Vignetting is a well-known effect observable especially in digitally recorded images and characterized as a circularly symmetrical shading in the border areas of the image. In other words brightness of the image decreases towards borders of the image. The vignetting is sometimes called a light fall-off. Part of the vignetting effect is due to the imaging optical components, e.g. lenses, since the refraction in the border areas of the optics typically cause decrease in light level of the final image near the image borders. Part of the vignetting effect is sensor related. Factors effecting sensor related vignetting are micro lenses and the fill factor of the sensors. The fill factor is a ratio of the light sensitive area of a sensor pixel on its total area. Fill factors of pixels are improved by applying in front of each pixel a tiny individual micro lens that converges the light hitting the micro lens further on the even smaller-sized light sensitive element, e.g. photodiode, below it. Further, if the incoming light hits the sensor in deep enough angles, it may be absorbed to the "pixel walls" instead of reaching the actual light sensitive element on the bottom of the sensor.

1. Description Of The Prior Art

Some digital camera manufacturers do not correct the vignetting effect at all. With high quality optics vignetting may be neglible and it does not need to be corrected. However, typically digital camera sensor manufacturers use some sort of vignetting elimination. Especially in the very small sized digital camera modules, which typically include optical modules integrating both the optics and the sensors, there usually is a vignetting effect present. Usually the vignetting effect in these small and low-cost devices is significant and some correction for vignetting is required.

In the prior art solutions the vignetting effect is commonly corrected by compensating brightness of the image after the image has been recorded. Typically only the luminance level of the final image is corrected. In many cases a more accurate, but still simple method is needed in order to achieve a better image by a small and compact imaging device. Typically in prior art solutions either the correction is demanding, hard and time-consuming to implement, or the correction is only an average resulting in an inaccurate final image. One disadvantage with the prior brightness correction is that the colors having different wavelengths have been treated in a similar manner. Typically, correction values used in the prior art are average values and no chromatic correction is applied, although sensors include pixels with different colors and also the final image is presented in colors.

2. Brief Description Of The Invention

The aim of the present invention is to overcome the drawbacks of the prior solutions for correcting a vignetting effect in the final processed image. One aim of the present invention is to enhance quality of the final image especially by compensating for a vignetting effect more accurately and separately for all primary colors of the sensor. Another aim of the present invention is to keep the solution simple and usable especially in compact, small, cheap and lightweight camera devices. A further aim of the invention is to provide a simple and effective way to characterize the vignetting related performance of an imaging module using only a limited number of parameters.

The aim of the present invention is achieved by determining and compensating for the vignetting effect of the digital image captured with the imaging module separately for at least two of the primary color components of the imaging module.

A method according to the invention for forming a model for improving image quality of a digital image captured with an imaging module that comprises at least an imaging optics and an image sensor, where the image is formed through the imaging optics onto the light sensitive image sensor, is characterized in that     determining a vignetting effect of the digital image captured with the imaging module separately for at least two of the primary color components of the imaging module,     formulating vignetting models for at least two of the primary color components of said imaging module, and     combining said vignetting models into a single correction function defined using correction coefficients, the correction function defining a correction gain for different points (x,y) of the image.

A model according to the invention for correcting vignetting from a digital image captured with an imaging module that comprised at least an imaging optics and an image sensor, where the image is formed through the imaging optics onto the light sensitive image sensor, is characterized in that the model is obtainable by said method according to the invention for forming a model for improving image quality of a digital image captured with an imaging module.

A model according to the invention can be used for correcting vignetting from a digital image.

A method according to the invention for improving image quality of a digital image captured with an imaging module including an imaging optics and an image sensor, where the image is formed through the imaging optics onto the light sensitive image sensor, is characterized in that     a vignetting effect is separately compensated for at least two of primary colors of the imaging module by applying a correction function common for at least two of the primary color components of said imaging module, the correction function including correction coefficients pre-determined for a certain imaging module and a pre-determined correction gain for different points (x,y) of the image.

Apparatus according to the invention for determining a model for improving image quality of a digital image captured with an imaging module including an imaging optics and an image sensor, where the image is formed through the imaging optics onto the light sensitive image sensor, is characterized in that the apparatus includes:

means for determining a vignetting effect separately for at least two of the primary colors of the image module,     means for formulating vignetting models for at least two of the primary color components of said imaging module, and     means for combining said vignetting models into a single correction function defined using correction coefficients, the correction function including means for defining a correction gain for different points (x,y) of the image.

An imaging module according to the invention and including an imaging optics and an image sensor for forming an image through the imaging optics onto the light sensitive image sensor is characterized in that a model of the kind described above according to the invention for correcting vignetting from a digital image captured with an imaging module is related to said imaging module.

A device according to the invention is characterized in that the device includes an imaging module of the kind described above according to the invention.

A program module according to the invention for compensating a vignetting effect in a device including an imaging module is characterized in that the program module includes programmable means for implementing a method of the kind described above according to the invention for improving image quality of a digital image captured with an imaging module.

A program product according to the invention for compensating of a vignetting effect in an imaging module is characterized in that the program product includes software means for implementing a method of the kind described above according to the invention for improving image quality of a digital image captured with an imaging module.

Embodiments of the present invention are described in detail below.

Apparatus according to embodiments for determining a model for improving image quality of a digital image captured with an imaging module including an imaging optics and an image sensor, where the image is formed through the imaging optics onto the light sensitive image sensor, includes means for determining a vignetting effect separately for at least two of the primary colors of the image module.

According to an embodiment apparatus includes means for formulating vignetting models for at least two of the primary color components of said imaging module, and means for combining said vignetting models into a single correction function defined using correction coefficients, the correction function including means for defining a correction gain for different points (x,y) of the image.

According to embodiments a method for forming a model for improving image quality of a digital image captured with an imaging module including an imaging optics and an image sensor, where the image is formed through the imaging optics onto the light sensitive image sensor, includes a step of determining a vignetting effect of the digital image captured with the imaging module separately for at least two of the primary color components of the imaging module. According to embodiments the method includes the steps of formulating vignetting models for at least two of the primary color components of said imaging module, and combining said vignetting models into a single correction function defined using correction coefficients, the correction function defining a correction gain for different points (x,y) of the image.

According to an embodiment of the present invention the raw data achieved from the camera-sensor-module is processed so that the vignetting effect from the final processed image is corrected accurately. According to the embodiment of the present invention correction is implemented with a simple model having minimum number of parameters. In the embodiments of the present invention the good quality of the correction is achieved by a simple and light model that is executable also with small, compact devices.

According to an embodiment of the present invention the vignetting correction is modelled with a polynomial that is parameterized. According to one embodiment the polynomial is a $6^{th}$ degree polynomial. In embodiments of the invention, the polynomial contains a parameter for modelling the difference in vignetting between different primary color components. Thus, in the present invention, the differences between color components are taken into account. The applied color components can be three color RGB-components (red, green, blue), four color CMYG-components (cyan, magenta, yellow, green) or any other chosen primary color components. Also according to the correction of the present embodiment it is possible to define a center for vignetting that is different from the image center. This is advantageous for slightly misaligned optics, in which the optical axis and the center axis of the visible pixels are not exactly congruent for manufacturing reasons, etc.

According to another embodiment of the present invention, the vignetting correction is modelled with a polynomial including a parameter for describing a pixel shape. In this embodiment there is also modelled pixels that are not square shaped. Some sensors have pixels having a height different than the width. Different kinds of non-square shapes of pixels are taken into account in this embodiment of the present invention. The model of the embodiment includes a parameter, which describes the shape of the pixel, which is taken into consideration also when forming the final image, i.e. when using the formed model.

The algorithm presented in the embodiments of the present invention is simple. One advantage is that the correction parameters need to be determined only once to a certain camera-sensor-type. After the determination, parameters can be used for modelling and correcting images produced with said camera-sensor-type. Further, the correction according to embodiments of the present invention is easy to transfer from sensor manufacturer to camera manufacturer, since only few parameters are needed to characterize the correction function used for the sensor module. The minimum information is required to be transmitted to the camera manufacturer and to be stored and used in a final product (i.e. camera) when using the vignetting compensation. Due to the simplicity of the method of the embodiments, it is possible, if necessary, to characterize individual optical modules during their manufacture and to implement individual correction for those modules in the final camera products.

In embodiments of the present invention the number of characterizing features in the correction function is kept to a minimum. This allows easy introduction of new sensor modules by applying only a minimum number of parameters. It is enough that the sensor manufacturer transmits with a new sensor the certain coefficients and parameters required that characterize the sensor in question. The coefficients and parameters used in the model are typically the same for a certain set of sensors. According to one embodiment, the coefficients and parameter values are sensor-specific. Typically also the optics used influences the parameters of the model. According to an embodiment, parameters and coefficients of the model are determined for a certain optic-sensor-module. If there are any changes in optics or in sensors, parameters and coefficients for the model are determined again. A new determination according to an embodiment is easy and fast to implement, so vignetting is modelled effortlessly to a new configuration of optic-sensor-module.

In the embodiments of the present invention the required parameters describe size of an image plane, vignetting effect in a certain point (x,y) of the image plane, degree of compensation and coefficients for each primary color components. Embodiments of the invention allow the manufacturer of a module having imaging optics and imaging light sensor to characterize the vignetting performance of the module and provide the camera manufacturer implementing the module in his product a simple set of parameters, which parameters can be used in the end product to make the necessary image correction.

According to the embodiments, the amount of information is kept to a minimum and the implementation is kept easy, simple and cheap. The parameters are easy and effortless to transmit and execution of the model remains light. According to embodiments of the present invention only a little amount of memory is consumed when modelling and compensating the vignetting effect in a camera device. Further parameters and coefficients for modelling are determined only once for a certain camera-sensor-module, so continuous calculations are not required.

According to embodiments of the present invention the model is easily applicable for different sensors by only using a different set of parameters. The modelling, i.e. use of the model with the determined parameters and coefficients, according to embodiments is executable also in small, compact devices effectively. Embodiments can be used with zooming and cropping functions. One important benefit of embodiments is that scaling of an image does not change the parameters used in the model.

BRIEF DESCRIPTION OF THE FIGURES

In the following embodiments of the present invention are described in detail with the accompanying pictures in which.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized, and structural and functional modifications may be made without departing from the scope of the present invention.

Figure 1:
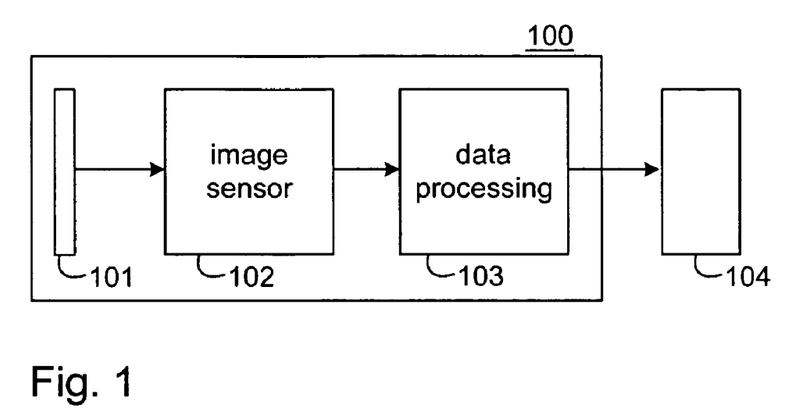
FIG. 1 presents a digital camera according to an embodiment of the present invention.

In an embodiment of FIG. 1 there is schematically presented a digital camera 100. The digital camera of FIG. 1 includes a lens system 101, an image sensor 102 and data processing means 103. The image, or a light pattern formed by a lens system 101 is captured by an image sensor 102, which converts the light pattern in to an electrical form. The electrical data is processed with data processing means 103. The processed data is then transmitted to an external or to an integrated peripheral or interface 104. The block 104, where the data can be transmitted to or used in, is for example a digital still camera, such as a minicam or a miniature USB (Universal Serial Bus) flash drive; a digital video camera; a USB application, such as a web camera, a toy, a game or a biometric application; or an embedded application, such as a PDA (personal digital assistant), a network camera, a notebook, a PC (personal computer), a mobile phone, a set-topbox or a security application.

The image sensor in FIG. 1 can be a CMOS (complementary metal oxide semiconductor) image sensor, which is one typically used sensor in digital cameras. There are two types of CMOS sensors: active pixel sensors (APS) and passive pixel sensors. Another type of sensors in a digital camera are charge coupled device (CCD) image sensors. Sensors are basically electronic devices that are capable of transforming a light pattern, i.e. an image formed by a lens system 101, into an electric charge pattern, i.e. an electronic image. Both CCD and CMOS sensors 102 convert light into electric charge and process 103 it into electronic signals. Basically, at the priority date of the present application the quality of a final image produced with a CCD sensor is somewhat better, but a CMOS sensor operates at lower voltage. The present invention is not limited to sensor types described in the present application, but it may be applied also to any other present or future pixel type sensors suitable for digital imaging use.

A CCD sensor 102 consists of several individual elements. These elements are capable of collecting, storing and transporting electrical charge from one element to another. Each photosensitive element will then represent a picture element, i.e. a pixel. Usually each pixel in a digital camera sensor 102 contains a light sensitive photodiode. Data processing block 103 typically includes one or more output amplifiers at the edge of the chip in order to collect the signals from the CCD 102. After the sensor 102 is exposed with a light pattern, an electronic image is obtained in data processing block 103 by applying a series of pulses that transfer the charge of one pixel after another to the output amplifier, line after line. The output amplifier converts the charge into a voltage. External electronics in a data processing block 103 will transform this output signal into a form suitable for e.g. monitors 104.

Where in a CCD sensor every pixel's charge is transferred through a very limited number of output nodes to be converted to voltage, buffered and sent off-chip as an analog signal, in a CMOS sensor, on the other hand, each pixel has its own charge-to-voltage conversion. In CMOS each pixel contains not just a photodiode, but in addition amplifiers and selection circuitry. A CMOS sensor also often includes digitization circuits so that the chip outputs digital bits. These additional functions of CMOS compared to CCD reduce the area available for light capture, and with each pixel doing its own conversion, uniformity is lower. CCD arrays can be arranged as a linear array, frame transfer area array, full frame area array, and interline transfer area array. CCDs offer good image performance (measured in quantum efficiency and noise) at the expense of the system size. CMOS imagers offer more functions on the chip, lower power dissipation (at the chip level), and smaller system size at the expense of image quality and flexibility.

The photosensitive elements, e.g. photodiodes, of sensors measure brightness of light. Photodiodes are monochrome devices and unable to differentiate light by wavelength. Image sensors 102 can be a monochrome sensor or a color sensor. A monochrome image sensor senses only in black and white, i.e. shades of gray. In a color image sensor an integral color filter array is situated on top of a sensor in order to be able to distinguish colors. The color array is typically a Bayer color filter array. Digital imaging optical format is a measure of the size of the imaging area. Optical format is used to determine what size lens is necessary for use with the imager. Optical format refers to the length of the diagonal of the imaging area. The number of pixels and pixel size are also important factors for the final image. Horizontal pixels refer to the number of pixels in a row of the image sensor. Vertical pixels refer to the number of pixels in a column of the image sensor. Usually pixels are square, but other shapes, e.g. rectangular, are also possible.

According to one embodiment, there is made a calibration measure over a uniformly illuminated target to specify the amount of vignetting in a calibration image. The calibration image recorded from a uniformly illuminated target is divided in certain number of blocks. Typically blocks are equal in size. According to an embodiment a certain area of an image requiring more detailed correction, has smaller blocks situated in a more dense and compact way. The number of blocks should be chosen so that number of them is optimal for the implementation. One typical number for blocks is 19 ×19. There is typically chosen an odd number of blocks so that the center of the image can be determined as one block or within one block, e.g. a center point of the block. The number of blocks is determined taking into consideration the size of the image and the number of pixels in it. The blocks must be big enough in size so that background noise will not disturb the implementation. On the other hand, the blocks must be small enough in order to have stable vignetting effect inside one block. If there are too many small blocks, there will be disturbing noise. If the blocks are too wide, there will be differences in vignetting inside one block. Both mentioned disadvantages, the background noise and vignetting variations inside one block, will disturb modelling and cause vagueness to the resulting image. The size of blocks is chosen such that optimum quality is achieved and annoying effects are minimized.

After the blocks are determined, every color point is determined separately in every block. Used color components can be a typical three color component including three primary colors, i.e. RGB (red, green, blue), or for example a four color component, i.e. so called CMYG (cyan, magenta, yellow, green), or any other suitable color component. Values for each color component in each block are according to an embodiment stored in the form of a matrix.

Figure 2:
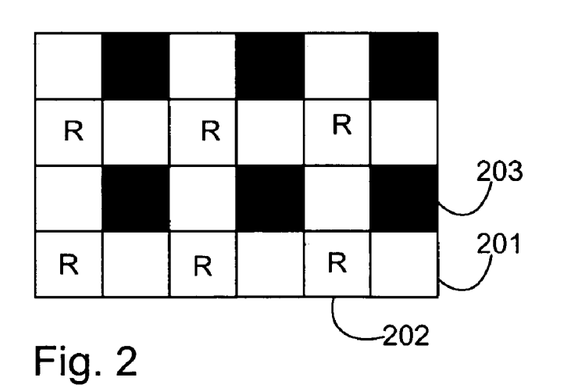
FIG. 2 presents a color filter array according to an embodiment of the present invention.

According to one embodiment, modelling is implemented with RGB color components by using the green color component as a reference component. The reason for choosing the green component as a reference is that there is twice the number of green pixels compared to the number of any other color component in the sensor having the three color components. As can be seen from FIG. 2, typically in an RGB array every other color in the array is green 201. In FIG. 2 the red component is pictured by squares 202 marked with letter R and blue component is pictured by dark squares 203. It can be seen from FIG. 2 that only one fourth of the components are red 202 and similarly one fourth of those are blue 203, whereas one half of the components are green 201.

Figure 3:
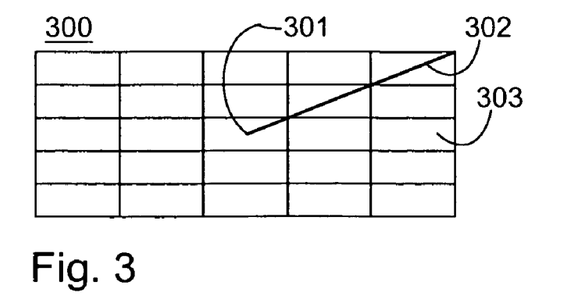
FIG. 3 presents an image plane divided into blocks according to an embodiment of the present invention.

A uniformly illuminated target 300 forming a calibration image is divided to blocks 303 in FIG. 3. The middle point 301 is in this embodiment in the middle point of the image. When a correction polynomial is modelled for a certain lens-sensor-module, the middle point 301 is a middle point of the middle block, which is congruent with the optical middle point, i.e. location of the optical axis. According to an embodiment, the middle point 301 is an optical middle point also in the correction phase, when using the modelled correction polynomial for a certain lens-sensor-module. The distance 302 from the middle point to 301 the farthest edge of the image plane is determined to always be 1. The vignetting is determined through the line 302 for each color component in each block. The values are stored in the form of a matrix. As a result, there is achieved a matrix including values for certain color components, in each block. Each color component is determined separately. According to an embodiment, a measurement made over a uniformly illuminated calibration target results in average values for matrices.

Figure 4:
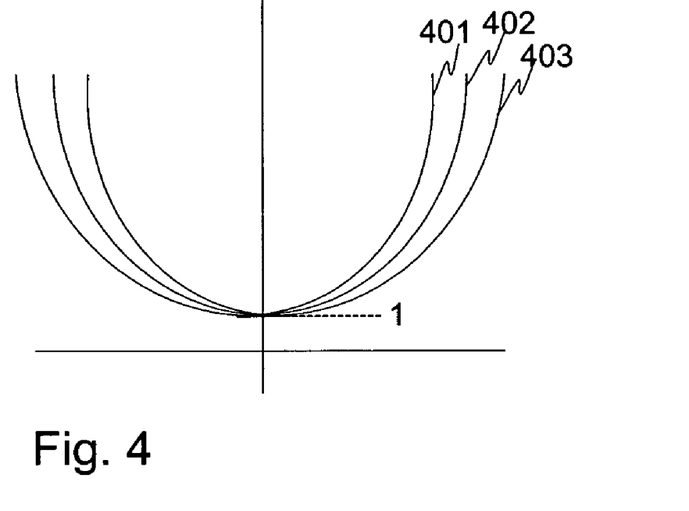
FIG. 4 presents curves produced according to an embodiment of the present invention.

Values stored in matrices can be used to form curves, as presented in FIG. 4, representing a correction polynomial according to an embodiment of the present invention. A presented curve represents inversed pixel values detected. The X-axis gives the distance from the center of the calibration image. In the embodiment of FIG. 4 the higher the inversed pixel value, the higher the correction necessary to compensate for the light fall-off increasing towards the edges of the image. In FIG. 4 the three different curves represent different colors. The zero point in horizontal direction, where all curves coalesce, is parametrized to have value 1 in the vertical direction. The middle curve 402 represents the green color component. The upper curve 401 illustrates the behaviour of the red color component and the lower curve 403 illustrates the behaviour of the blue color component. Green curve 402 in the middle is typically used as a reference curve when forming the model. The correction gains for the other color components are formulated by using some color specific coefficient representing the specific color in the polynomial.

In the following exemplary embodiment, circularly symmetrical vignetting is assumed. According to embodiments of the present invention, correction gain of a vignetting effect is a function of a distance from the vignetting center. The correction of vignetting is modelled with a $6^{th}$ degree polynomial. This polynomial is applied separately to every color. In the embodiment the input data, i.e. the raw camera data is in a linear color space and the black level is zero. The $6^{th}$ degree polynomial modelling the correction of vignetting is parametrized with a coefficient $a_{COEFF}$, and parameters $a_1$, $a_2$, $a_3$. The coefficient $a_{COEFF}$ illustrates the degree of correction and the parameters $a_1$, $a_2$, $a_3$ depend on the optics-sensor-module employed. Values for the parameters $a_1$, $a_2$, $a_3$ are achieved from the matrices stored. Values calculated for the green color component on the line 302 of FIG. 3 are presented as a $6^{th}$ degree polynomial according to an embodiment of the present invention in FIG. 4, line 402 at the right side of the vertical axis. Coefficients and parameter values for the $6^{th}$ degree polynomial and the curves representing the polynomial are achieved from values calculated for each block of the illuminated target and stored in the matrices.

In the present embodiment the center of vignetting is determined as a middle point of an image. According to an embodiment, the center of vignetting has the smallest correction gain (1.0) and the point that is the farthest from the center has the biggest correction gain. According to another embodiment, the distance having the biggest correction gain can be determined to any valid distance from the vignetting center in the visible area. According to an embodiment, the correction gain can vary as function of square distance over the visible area. The differences in vignetting between the color components are parametrized with multipliers, for example $R_{COEFF}$ for red, $G_{COEFF}$ for green and $B_{COEFF}$ for blue. The center of vignetting is indicated with $(x_{VIGNCENTER}, y_{VIGNCENTER})$. The value $(x_{VIGNCENTER}, y_{VIGNCENTER})=(0.5, 0.5)$ corresponds to the center of the visible image area and the value $(x_{VIGNCENTER}, y_{VIGNCENTER})=(0.0, 0.0)$ corresponds to the left/bottom edge of the visible image area.

The vignetting elimination that corresponds to the parameters is described by the following equation, for all color components, for example in this embodiment red, green and blue (RGB). The equation is formulated mathematically in the following way:

$$\forall C \in \{R,G,B\} \land \forall x \in N | x \in [0, x_{SIZE}[ \land \forall y \in N | y \in [0, y_{SIZE}[$$
$$[: C_{CORRECTED}(x,y) = C_{ORIGINAL}(x,y) \cdot GAIN_{VE}(x, y), \text{ where}$$

$$GAIN_{VE}(x,y) = 1.0 + C_{COEFF} \cdot a_{COEFF} \cdot (a_1 \cdot d(x,y)^2 + a_2 \cdot d(x,y)^4 + a_3 \cdot d(x,y)^6)$$

In the previous $6^{th}$ degree equation for correction GAIN, which represents the polynomial for modelling the vignetting correction according to an embodiment of the present invention, $x_{SIZE} \in N$ and $y_{SIZE} \in N$.

$C_{COEFF} \in R$. $C_{COEFF}$ represents the coefficient for a certain color component, for example one of the RGB components.

$a_{COEFF} \in R | a_{COEFF} \in [0.0, 1.0]$. $a_{COEFF}$ typically has value of one (1) representing the degree of compensation. The value one corresponds to the full compensation.

$a_i \in R | i \in \{1,2,3\}$. The coefficients $a_i$ of the expression $(a_1 \cdot d(x,y)^2 + a_2 \cdot d(x,y)^4 + a_3 \cdot d(x,y)^6)$ are included in the matrices calculated from the original illuminated target according to an embodiment of the present invention. The matrices includes the expression $(a_1 \cdot d(x,y)^2 + a_2 \cdot d(x,y)^4 + a_3 \cdot d(x,y)^6)$ for certain distance (x,y) from the center of vignetting. In this equation the distances are formulated as follows $$d(x,y)^2 = (x - x_{VIGNCENTRE} \cdot (x_{SIZE}-1))^2 + (y - y_{VIGNCENTRE} \cdot (y_{SIZE}-1))^2 / (x_F - x_{VIGNCENTRE} \cdot (x_{SIZE}-1))^2 + (y_F - y_{VIGNCENTRE} \cdot (y_{SIZE}-1))^2$$

where $$x_{VIGNCENTRE} \in R | x_{VIGNCENTRE} \in [0.0, 1.0]$$

$$y_{VIGNCENTRE} \in R | y_{VIGNCENTRE} \in [0.0, 1.0]$$

(x,y) is the pixel coordinate, and $x_{SIZE}$ and $y_{SIZE}$ are the width and height of the visible image area in pixels, respectively.

$(x_F, y_F)$ is the corner point of the visible image area that is the farthest from the center point of vignetting. The center point of vignetting is determined as $(x_{VIGNCENTRE} \cdot (x_{SIZE}-1), y_{VIGNCENTRE} \cdot (y_{SIZE}-1))$.

$x_{VIGNCENTRE}$ is the x-coordinate for the center point of vignetting. With the aid of this parameter it is possible to determine a center of vignetting, which differs from the center of the image plane. In other words this embodiment allows the displacement of the center of the vignetting to be taken into account when forming the final image.

$y_{VIGNCENTER}$ is y-coordinate for the center spot of vignetting, similarly.

$x_F$ is x-coordinate for the farthest point of the image plane from the center of vignetting.

$y_F$ is corresponding y-coordinate for the farthest point of the image plane from the center of vignetting. If the point of examination (x,y) is the farthest point of the image plane, i.e. $(x,y)=(x_F, y_F)$, the distance d(x,y) from the point of examination to the center point of the vignetting is 1. The farthest distance d(x,y) from the center of vignetting is always 1.

$((x_{SIZE}-1)$ is distance between the farthest horizontal points of the visible image area.

$(y_{SIZE}-1))$ is distance between the farthest vertical points of the visible image area.

According to an embodiment all different colors used are weighed with the color coefficients $C_{COEFF}$. This has the advantage that only one look-up-table needs to be produced for a used reference color and other color components are implemented by adding a color coefficient $C_{COEFF}$ to a reference correction model. The implementation including only one look-up-table is typically most efficient for memory and computing. According to another embodiment there is produced number of look-up-tables, usually one for each color. According to another embodiment the coefficients for different colors are determined separately. Color coefficients are measured as a function of a square distance.

The value of $a_{COEFF}$ representing ratio of compensation can be adjusted to be smaller, i.e. to decrease the degree of compensation, since with the high correction also possible annoying noise is gained equally. According to an embodiment the value for $a_{COEFF}$ is determined with the other coefficients and parameters of a correction polynomial and stored in the look-up-table with the other values for certain optic-sensor-module or -type.

The values of coefficients $a_i$ depend on the optic-sensor-module used and are different for different types of sensors. The number of coefficients $a_i$ is typically at least two. According to an embodiments, three coefficients $a_i$ are used i.e. i=1,2,3. Regardless of number of coefficients, it is possible to determine for a certain i, that $a_i=0$. Thus, the valid number of coefficients depends e.g. on the application, the equipment used and the requirements. According to an embodiment, coefficients $a_i$ need not be calculated for every pixel of an image separately, but the coefficients can be determined block by block. Correction coefficients $a_i$ are calculated as a function of square distance. Calculated values are stored in a look-up-table. The accuracy used can be varied according to an application and requirements. The more dense calculations yield to more accurate and detailed correction coefficients. It is possible, but usually not necessary, to calculate the coefficients $a_i$ for each possible distance, i.e. for each pixel place separately. According to an embodiment, correction coefficients $a_i$ are calculated for each block, for example 512-1024 times depending on the chosen number of blocks divided from the image plane. When speed is an issue and the number of individual calculations needs to be minimized, the distance can be determined according to the middle point of a block. Blocks are typically sized as 2×2, 2×4, 4×2, 4×4, and so on (in pixels). In a correction phase, when using the correction model for enhancing an image, the distance square can be calculated for the place of each pixel separately. An image can also be divided in blocks in a correction phase, but the size of the blocks should remain relatively small in order to keep the final image continuous. Neighboring blocks having different correction coefficients can cause aberrations in the final image, i.e. the visible image also has different blocks due to different correction coefficients.

Figure 5:
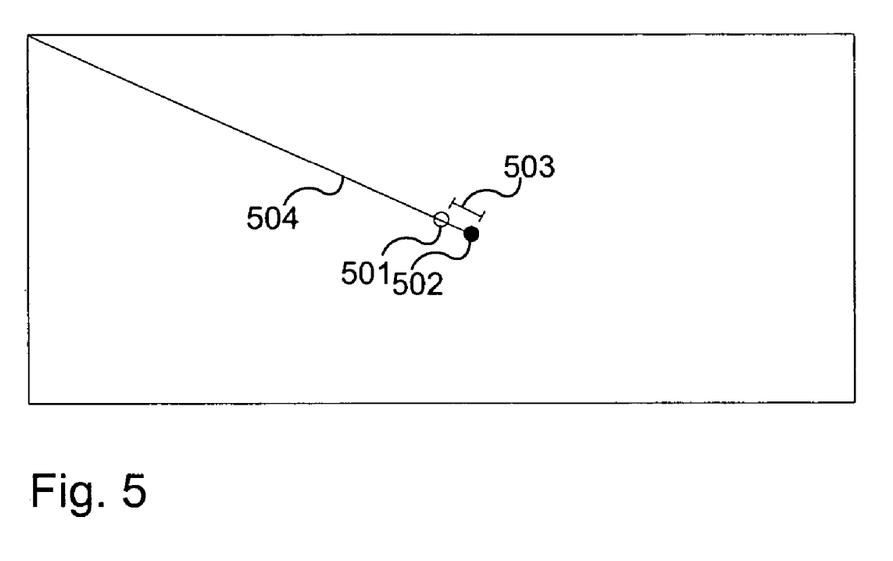
FIG. 5 presents an image plane according to an embodiment of the present invention.

In FIG. 5 there is presented an image plane having a center point 501 and the center of vignetting 502 that is different from the image center point 501. Typically an image doesn't have any certain pixel in the middle or center point 501 of a visible image, since the number of pixels forming the image is even. Thus typically the middle point 501 of an image is determined as a junction point in the middle of four pixels. The middle point 501 of the visible image is thus determined with the aid of the middle point of the farthest corner point $(x_F, y_F)$. With the embodiment of the present invention the misalignment of vignetting center 502, i.e. incongruity of vignetting center 502 and image 501, is taken into account by determining the center of vignetting $(x_{VIGNCENTRE}, y_{VIGNCENTER})$ separately from the center of an image area. This misalignment can be taken into account when raw data of images are corrected with aid of the determined model, i.e. in using the phase of the model.

The distance between image center 501 and vignetting center 502 is in this embodiment illustrated with line segment 503. The farthest distance from the vignetting center 502 to a corner of an image plane 504 is determined to be equal to 1. The other edges of image plane thus have a distance less than one from the vignetting center 502 according to an embodiment of the present invention. According to this embodiment, the center of vignetting 502 has the smallest correction gain (1.0) and the point that is the farthest from the center, i.e., the upper left corner of the image plane in FIG. 5, has the biggest correction gain. According to another embodiment, the correction gain can be determined to be biggest at a certain point of the image, e.g. a distance 0.8 from the center of vignetting 502. In such an embodiment, the correction gain is smaller before this distance, i.e. nearer the middle point 502, and it turns smaller again after the distance 0.8 having the maximum value for the correction gain. The 6. degree polynomial according to embodiments is capable of presenting different kinds and shapes of corrections.

According to another embodiment, the model also takes into account the shape of the pixels. Pixels do not need to be square shaped, but can be for example rectangular, i.e. the height of a pixel is not the same as the width. For example blocks divided from the image plane in FIG. 3 are rectangular and may represent the shape of the original pixels. In the model according the embodiment, the shape of the pixel is determined by a parameter aspect_ratio$_{COEFF}$. By adding the parameter describing the shape of the pixel to the model it is possible to take into account different pixel shapes. The distance parameter d(x,y) in the model according to the present embodiment is presented as follows $$d(x,y)^2 = (x - x_{VIGNCENTRE} \cdot (x_{SIZE} - 1))^2 + \text{aspect\_ratio}_{COEFF}^2 \cdot (y - y_{VIGNCENTRE} \cdot (y_{SIZE} - 1))^2 / (x_F - x_{VIGNCENTRE} \cdot (x_{SIZE} - 1))^2 + \text{aspect\_ratio}_{COEFF}^2 \cdot (y_{F-y}{VIGNCENTRE} \cdot (y_{SIZE} - 1))^2.$$

The value of the parameter aspect_ratio$_{COEFF}$ is 1.0 for square shaped pixels. In the embodiment with rectangular shaped blocks, it is essentially important to differentiate the horizontal and vertical directions, since there can be a remarkable difference in size. Ignoring the shape may yield to unallowable compensation of vignetting. This embodiment enables use of sensors having non-square rectangular pixels or other, i.e., elliptical shading.

Typically the correction polynomial according to embodiments of the present invention is determined for certain optic-sensor-types. After determination, the correction polynomial can be used in such or certain kinds of devices for correcting a vignetting effect from the final image. According to an embodiment, in a correction phase, i.e. when using the polynomial, it is possible to apply the correction polynomial to each pixel separately. According to another embodiment, the image is divided into blocks also in the correction phase in order to speed up the phase and make it more efficient.

Embodiments include a model for correcting vignetting from a digital image captured with an imaging module that is obtainable by the method described above. Embodiments further include a method for determining a model for correcting vignetting from a digital image captured with an imaging module. Embodiments include also a method for using a model for correcting vignetting from a digital image captured with an imaging module.

According to an embodiment, a method for improving image quality of a digital image captured with an imaging module including an imaging optics and an image sensor, where the image is formed through the imaging optics onto the light sensitive image sensor, includes steps of compensating for a vignetting effect separately for at least two primary colors of the imaging module. According to an embodiment, a method for improving image quality includes a step of applying a correction function for at least two of the primary components of said imaging module, wherein the correction function includes correction coefficients pre-determined for a certain imaging module and a pre-determined correction gain for different points (x,y) of the image.

Embodiments include an imaging module including imaging optics and an image sensor for forming an image through the imaging optics onto the light sensitive image sensor, wherein the imaging module includes a correction function obtainable by the invention.

Embodiments include a device including an imaging module according to embodiments of the present invention. The device according to embodiments is a mobile phone, camera phone, portable digital camera, or any other small, compact device including an imaging module. A device typically includes a program module for compensating a vignetting effect in the device including an optic-sensor-module. The program module includes a programmable means for implementing method steps according to embodiments of the invention. A device can include a program product for compensating of a vignetting effect in an optic-sensor-module. The program product includes software means for implementing method steps according to embodiments of the invention.

We claim:

1. Method for forming a model for improving image quality of a digital image captured with an imaging module comprising at least an imaging optics and an image sensor, where the digital image is formed through the imaging optics onto a light sensitive image sensor, the method comprising:

determining a vignetting effect of the digital image captured with the imaging module for at least two of plural primary color pixels of the light sensitive image sensor, formulating vignetting models for said at least two primary color pixels of said light sensitive image sensor, and combining said vignetting models into a single correction function defined using correction coefficients, the correction function defining a correction gain for different points (x,y) of the digital image wherein a corrected value for a certain point (x,y) is determine by multiplying an original value of the certain point (x,y) by the correction gain on the same point (x,y), and the corrected value is formulated mathematically as follows:

$$C_{CORRECTED}(x,y) = C_{ORIGINAL}(x,y) \text{GAIN}_{VE}(x,y),$$

where the correction gain is formulated mathematically as follows:

$$\text{GAIN}_{VE}(X,Y) = 1.0 + C_{COEFF} \cdot a_{COEFF} \cdot (a_1 \cdot d(x,y)^2 + a_2 \cdot d(x,y)^4 + a_3 \cdot d(x,y)^6), \text{ where}$$

distance parameters $d(x,y)^2$ describe distance from a center of vignetting to the certain point (x,y), parameters $a_1, a_2, a_3$, describe correction coefficients for a certain optic-sensor-module, coefficient $a_{COEFF}$ determines a degree of compensation, and color-specific coefficient $C_{COEFF}$, which describes behavior of a certain color, is determined for each primary color pixel separately.

2. The method for forming a model according to claim 1, wherein the formulating the vignetting models includes taking a calibration measure over a uniformly illuminated target for producing a calibration image.

3. The method for forming a model according to claim 2, wherein the calibration image having a certain size ($x_{SIZE}$, $y_{SIZE}$) is divided into a certain number of blocks in order to determine coefficients and parameters of the model block by block.

4. The method for forming a model according to claim 3, wherein every primary color pixel of the light sensitive image sensor is determined separately in every block in order to determine for each primary color pixel a color-specific coefficient $C_{COEFF}$ describing behavior of a certain color component, which coefficient $C_{COEFF}$ is included in the correction function for compensating each primary color pixel of the light sensitive image sensor separtely.

5. The method for forming a model according to claim 1, wherein the correction function is a polynomial function.

6. The method for forming a model according to claim 1, wherein imaging module specific correction coefficients $a_i$ are determined as a function of a square distance from a middle point of the digital image.

7. A The method for forming a model according claim 1, wherein the coefficient $a_{COEFF}$ is determined to be equal to one, when full compensation is required.

8. The method for forming a model according to claim 1, wherein the distance parameters are formulated mathematically by determining parameters: size of image plane ($x_{SIZE}$, $y_{SIZE}$, center of vignetting ($x_{VIGNCENTRE}$, $y_{VIGNCENTRE}$), point in the image plane farthest from the center of vignetting ($x_F$, $y_F$), and by using determined parameters in an equation as follows:

$$d(x,y)^2 = (x - x_{VIGNCENTRE} \cdot (x_{SIZE}-1))^2 + (y - y_{VIGNCENTRE} \cdot (y_{SIZE}-1))^2 / (x_F - x_{VIGNCENTRE} \cdot (x_{SIZE}-1))^2 + (y_F - y_{VIGNCENTRE} \cdot (y_{SIZE}-1))^2.$$

9. The method for forming a model according to claim 1, wherein the distance parameters, taking into account shape of pixels, are formulated mathematically by determining parameters: size of image plane ($x_{SIZE}$, $y_{SIZE}$), center of vignetting ($x_{VIGNCENTRE}$, $y_{VIGNCENTRE}$), point farthest from the center of vignetting ($x_F$, $y_F$) and aspect_ratio$_{COEFF}$ relating to the shape of the pixels, and by using the determined parameters in the following equation:

$$d(x,y) = (x - -x_{VIGNCENTRE} \cdot (x_{SIZE}-1))^2 + \text{aspect\_ratio}_{COEFF}^2 \cdot (y - y_{VIGNCENTRE} \cdot (y_{SIZE}-1))^2 / (x_F - x_{VIGNCENTRE} \cdot (x_{SIZE}-1))^2 + \text{aspect\_ratio}_{COEFF}^2 \cdot (y_F - -y_{VIGNCENTRE} \cdot (y_{SIZE}-1))^2.$$

10. The method for forming a model according to claim 9, wherein the parameter aspect_ratio$_{COEFF}$ is determined to equal to 1.0 for square shaped pixels.

11. A method for forming a model for improving image quality of a digital image captured with an imaging module including an imaging optics and an image sensor, where the digital image is formed through the imaging optics onto the image sensor, method comprising:
compensating a vignetting effect separately for at least two of plural primary color pixels of the image sensor by applying a correction function common for said at least two primary color pixels of said image sensor, the correction function including correction coefficients predetermined for a certain imaging module and a predetermined correction gain for different points (x,y) of the digital image wherein a corrected value for a certain point (x,y) is determined by multiplying an original value of the certain point (x,y) by the correction gain on the same point (x,y), and the corrected value is formulated mathematically as follows:

$$C_{CORRECTED}(x,y) = C_{ORIGINAL}(x,y) \text{GAIN}_{VE}(x,y),$$

where the correction gain is formulated mathematically as follows:

$$\text{GAIN}_{VE}(X,Y) = 1.0 + C_{COEFF} \cdot a_{COEFF} \cdot (a_1 \cdot d(x,y)^2 + a_2 \cdot d(x,y)^4 + a_3 \cdot d(x,y)^6),$$

where the following parameters and coefficients are pre-determined for a certain imaging module:
distance parameters $d(x,y)^2$ describing distance from a center of vignetting to the certain point (x,y),
the parameters $a_1$, $a_2$, $a_3$, describing correction coefficients for said certain imaging module,
coefficient $a_{COEFF}$ determining a suitable degree of compensation, and
a color-specific coefficient $C_{COEFF}$, for each primary color pixel, describing behavior of a certain color.

12. The method for improving image quality according to claim 11, wherein the method includes compensating each primary color pixel of the image sensor separately using a pre-determined color-specific coefficient $C_{COEFF}$.

13. The method for improving image quality according to claim 11, wherein the correction function is a polynomial function.

14. The method for improving image quality according to claim 11, wherein the method comprises setting the coefficient $a_{COEFF}$ equal to 1, when full compensation is required.

15. The method for improving image quality according to claim 11, wherein the distance parameters are formulated mathematically aided by pre-determined parameters: size of an image plane ($x_{SIZE}$, $y_{SIZE}$, center of vignetting ($x_{VIGNCENTRE}$, $y_{VIGNCENTRE}$), point in the image plane farthest from the center of vignetting ($x_F$, $y_F$), as follows:

$$d(x,y)^2 = (x - x_{VIGNCENTRE} \cdot (x_{SIZE}-1))^2 + (y - y_{VIGNCENTRE} \cdot (y_{SIZE}-1))^2 / (x_F - x_{VIGNCENTRE} \cdot (x_{SIZE}-1))^2 + (y_F - y_{VIGNCENTRE} \cdot (y_{SIZE}-1))^2.$$

16. The method for forming a improving image quality according to claim 11, wherein the distance parameters, taking into account pixel shape aided by predetermined parameters: size of an image plane ($x_{SIZE}$, $y_{SIZE}$), center of vignetting ($x_{VIGNCENTRE}$, $y_{VIGNCENTRE}$), point farthest from the center of vignetting ($x_F$, $y_F$) and aspect_ratio$_{COEFF}$ relating to the pixel shape, are formulated mathematically as follows:

$$d(x,y)^2 = (x - -x_{VIGNCENTRE} \cdot (x_{SIZE}-1))^2 + \text{aspect\_ratio}_{COEFF}^2 \cdot (y - y_{VIGNCENTRE} \cdot (y_{SIZE}-1))^2 / (x_F - x_{VIGNCENTRE} \cdot (x_{SIZE}-1))^2 + \text{aspect\_ratio}_{COEFF}^2 \cdot (y_F - -y_{VIGNCENTRE} \cdot (y_{SIZE}-1))^2.$$

17. The method for improving image quality according to claim 16, wherein the method includes setting the parameter aspect_ratio$_{COEFF}$ equal to 1.0 for square shaped pixels.

18. Apparatus for determining a model for improving image quality of a digital image captured with an imaging module including imaging optics and an image sensor, where the digital image is formed through the imaging optics onto the image sensor, wherein the apparatus includes a processor configured to:
determine a vignetting effect separately for at least two of plural primary colors of the imaging module,
formulate vignetting models for said at least two primary color components of said imaging module, and
combine said vignetting models into a single correction function defined using correction coefficients, the correction function including means for defining a correction gain for different points (x,y) of the digital image wherein the processor is configured to measure a corrected value for a certain point (x,y) so that an original value of the certain point (x,y) is multiplied by the correction gain on the same point (x,y), the corrected value is formulated mathematically as follows:

$$C_{CORRECTED}(x,y) = C_{ORIGINAL}(x,y) \text{GAIN}_{VE}(x,y),$$

where the correction gain is formulated mathematically as follows:
$\text{GAIN}_{VE}(X,Y) = 1.0 + C_{COEFF} \cdot a_{COEFF} \cdot (a_1 \cdot d(x,y)^2 + a_2 \cdot d(x,y)^4 + a_3 \cdot d(x,y)^6)$, where the following parameters and coefficients are pre-determined for a certain imaging module:
distance parameters $d(x,y)^2$ describing distance from a center of vignetting to the certain point (x,y),
parameters $a_1$, $a_2$, $a_3$, describing correction coefficients for said imaging module,
coefficient $a_{COEFF}$ determining a suitable degree of compensation, and
a color-specific coefficient $C_{COEFF}$ for each primary color component, describing behavior of the primary color component.

19. The apparatus for determining a model according to claim 18, wherein the processor is configured to determine color-specific coefficients $C_{COEFF}$ for each primary color component of the imaging module.

20. The apparatus for determining a model according to claim 18, wherein the apparatus is configured to:
uniformly illuminate a target, means for measuring over a uniformly illuminated target to produce a calibration image, and
divide the calibration image having a certain size ($x_{SIZE}$, $y_{SIZE}$) into a certain number of blocks in order to determine parameters and coefficients for the model block by block.

21. The apparatus for determining a model according to claim 20, wherein the processor is configured to determine each color component separately in every block.

22. The apparatus for determining a model according to claim 18, wherein the correction function is a polynomial function.

23. The apparatus for determining a model according to claim 18, wherein the processor is configured to:
determine a center of vignetting ($x_{VIGNCENTRE}$, $y_{VIGNCENTRE}$), and
determine a distance from the center of vignetting ($x_{VIGNCENTRE}$, $y_{VIGNCENTRE}$) to a farthest point of an image plane ($x_F$, $y_F$) and setting the distance to be equal to 1.

24. The apparatus for determining a model according to claim 18, wherein the processor is configured to determine the correction gain as a function of a distance so that a biggest correction gain is at a certain distance from the center of vignetting.

25. The apparatus for determining a model according to claim 23, wherein the processor is configured to determine the correction gain as a function of a distance so that a biggest correction gain is at a certain distance from the center of vignetting.

26. The apparatus for determining a model according to claim 18, wherein the apparatus includes means for setting the coefficient $a_{COEFF}$ to be equal to 1, when full compensation is modeled.

27. The apparatus for determining a model according to claim 18, wherein the processor is configured to calculate the distance parameters in following way:

$$d(x,y)^2 = (x - x_{VIGNCENTRE} \cdot (x_{SIZE}-1))^2 + (y - y_{VIGNCENTRE} \cdot (y_{SIZE}-1))^2 / (x_F - x_{VIGNCENTRE} \cdot (x_{SIZE}-1))^2 + (y_F - y_{VIGNCENTRE} \cdot (y_{SIZE}-1))^2$$

by using pre-determined parameters: a size of the image plane ($x_{SIZE}$, $y_{SIZE}$), a center of vignetting ($x_{VIGNCENTRE}$, $y_{VIGNCENTRE}$), and a point farthest from the center of vignetting ($x_F$, $y_F$).

28. The apparatus for determining a model according to claim 18, wherein the apparatus includes means for formulating the distance parameters, taking into account pixel shape aided by a parameter aspect_ratio$_{COEFF}$, as follows:

$$d(x,y)^2 = (x - x_{VIGNCENTRE} \cdot (x_{SIZE}-1))^2 + \text{aspect\_ratio}_{COEFF}^2 \cdot (y - y_{VIGNCENTRE} \cdot (y_{SIZE}-1))^2 / (x_F - x_{VIGNCENTRE} \cdot (x_{SIZE}-1))^2 + \text{aspect\_ratio}_{COEFF}^2 \cdot (y_F - y_{VIGNCENTRE} \cdot (y_{SIZE}-1))^2$$

by using predetermined parameters: size of mage plane ($x_{SIZE}$, $y_{SIZE}$), center of vignetting ($x_{VIGNCENTRE}$, $y_{VIGNCENTRE}$), point farthest from the center of vignetting ($x_F$, $y_F$) and aspect_ratio$_{COEFF}$ relating to the pixel shape, and to set the parameter aspect_ratio$_{COEFF}$ to be equal to 1.0 for square shaped pixels.

* * * * *

UNITED STATES PATENT AND TRADEMARK OFFICE
CERTIFICATE OF CORRECTION

PATENT NO. : 7,548,262 B2  Page 1 of 1
APPLICATION NO. : 11/147477
DATED : June 16, 2009
INVENTOR(S) : Jarno Nikkanen et al.

It is certified that error appears in the above-identified patent and that said Letters Patent is hereby corrected as shown below:

In column 13, line 25, claim 9, line 10, "d(x,y)" should be --$d(x,y)^2$--.

In column 16, line 26, claim 28, line 9, "mage" should be --image--.

Signed and Sealed this

First Day of September, 2009

David J. Kappos
*Director of the United States Patent and Trademark Office*